United States Patent
Kordybach et al.

(10) Patent No.: US 12,538,192 B2
(45) Date of Patent: Jan. 27, 2026

(54) LOSSLESS DATA FORWARDING IN TELECOMMUNICATION SYSTEMS

(71) Applicant: NOKIA TECHNOLOGIES OY, Espoo (FI)

(72) Inventors: Krzysztof Kordybach, Wroclaw (PL); Jedrzej Stanczak, Wroclaw (PL); Ahmad Awada, Munich (DE); Srinivasan Selvaganapathy, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 379 days.

(21) Appl. No.: 18/001,712

(22) PCT Filed: Jun. 10, 2021

(86) PCT No.: PCT/EP2021/065570
§ 371 (c)(1),
(2) Date: Dec. 13, 2022

(87) PCT Pub. No.: WO2021/254859
PCT Pub. Date: Dec. 23, 2021

(65) Prior Publication Data
US 2023/0232292 A1    Jul. 20, 2023

(30) Foreign Application Priority Data
Jun. 19, 2020  (IN) .............................. 202041025908

(51) Int. Cl.
*H04W 36/00* (2009.01)
*H04W 36/02* (2009.01)

(52) U.S. Cl.
CPC ..... *H04W 36/0079* (2018.08); *H04W 36/023* (2013.01)

(58) Field of Classification Search
CPC ... H04W 36/00; H04W 36/02; H04W 36/023; H04W 76/18; H04W 76/19; H04W 36/0079
See application file for complete search history.

(56) References Cited

U.S. PATENT DOCUMENTS

| | | | | |
|---|---|---|---|---|
| 2017/0171903 A1* | 6/2017 | Kubota | ................. | H04W 48/16 |
| 2018/0035338 A1* | 2/2018 | Wang | .................... | H04W 36/38 |

(Continued)

FOREIGN PATENT DOCUMENTS

| | | | | |
|---|---|---|---|---|
| EP | 2184949 A1 | 5/2010 | | |
| WO | WO-2010105397 A1 * | 9/2010 | .......... | H04W 36/385 |

OTHER PUBLICATIONS

International Search Report and Written Opinion for International Application No. PCT/EP2021/065570, mailed Nov. 18, 2021, 16 pages.

(Continued)

*Primary Examiner* — Jinsong Hu
*Assistant Examiner* — Farideh Madani
(74) *Attorney, Agent, or Firm* — Lippes Mathias LLP

(57) ABSTRACT

A method, apparatus, and a computer-readable storage medium are provided for forwarding of buffered user data at a target node to a re-establishment node. In an example implementation, the method may include receiving, by a first network node, a handover cancel or an Xn-User plane address indication message from a second network node, the handover cancel or the Xn-User plane address indication message including tunnel addresses for one or more data radio bearers; and forwarding, by the first network node, buffered downlink packets to a third network node or the second network node, the forwarding based at least on the tunnel addresses. In an additional example implementation, the method may include sending, by a third network node, tunnel addresses for one or more data radio bearers to a (Continued)

second network node upon re-establishing of a radio resource control connection; and receiving, by the third network node, buffered packets at the first network node from a second network node or the first network node. In an additional example implementation, the method may include initiating, by a user equipment, a radio resource control re-establishment procedure with a third network node, the re-establishment procedure is initiated upon a handover failure of the user equipment from a second network node to a first network node; and receiving, by user equipment, buffered packets at the first node from a third network node.

3 Claims, 11 Drawing Sheets

(56) References Cited

U.S. PATENT DOCUMENTS

| | | | | |
|---|---|---|---|---|
| 2019/0150043 | A1* | 5/2019 | Lundqvist | H04W 36/02 370/331 |
| 2019/0320476 | A1* | 10/2019 | Wang | H04W 76/15 |
| 2021/0409941 | A1* | 12/2021 | Rajendran | H04W 80/02 |
| 2022/0377630 | A1* | 11/2022 | Wu | H04W 36/0079 |

OTHER PUBLICATIONS

3GPP TS 38.423 V16.1.0 (Mar. 2020); "3rd Generation Partnership Project; Technical Specification Group Radio Access Network; NG-RAN; Xn application protocol (XnAP) (Release 16)"; Sophia Antipolis, Valbonne, France; Mar. 31, 2020; 334 pages.

* cited by examiner

LOSSLESS DATA FORWARDING IN TELECOMMUNICATION SYSTEMS

CROSS-REFERENCE TO RELATED APPLICATIONS

This application is a national stage entry of International Application No. PCT/EP2021/065570, filed Jun. 10, 2021, entitled "LOSSLESS DATA FORWARDING IN TELECOMMUNICATION SYSTEMS" which claims the benefit of priority of Indian Application No. IN 202041025908, filed Jun. 19, 2020, both of which are hereby incorporated by reference in their entireties.

TECHNICAL FIELD

This description relates to wireless communications, and in particular, to handover failures.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP or Evolved Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra-reliable and low-latency communications (URLLC) devices may require high reliability and very low latency.

SUMMARY

Various example implementations are described and/or illustrated. The details of one or more examples of implementations are set forth in the accompanying drawings and the description below. Other features will be apparent from the description and drawings, and from the claims.

A method, apparatus, and a computer-readable storage medium are provided for forwarding of user data from a target node to another node, referred to as a re-establishment node in the present disclosure.

In an example implementation, the method may include receiving, by a first network node, a handover cancel or an Xn-User plane address indication message from a second network node, the handover cancel or the Xn-User plane address indication message including tunnel addresses for one or more data radio bearers; and forwarding, by the first network node, buffered downlink packets to a third network node or the second network node, the forwarding based at least on the tunnel addresses.

In an additional example implementation, the method may include sending, by a third network node, tunnel addresses for one or more data radio bearers to a second network node upon re-establishing of a radio resource control connection; and receiving, by the third network node, buffered packets at the first network node from a second network node or the first network node.

In an additional example implementation, the method may include initiating, by a user equipment, a radio resource control re-establishment procedure with a third network node, the re-establishment procedure is initiated upon a handover failure of the user equipment from a second network node to a first network node; and receiving, by user equipment, buffered packets at the first node from a third network node.

DETAILED DESCRIPTION

Figure 1:
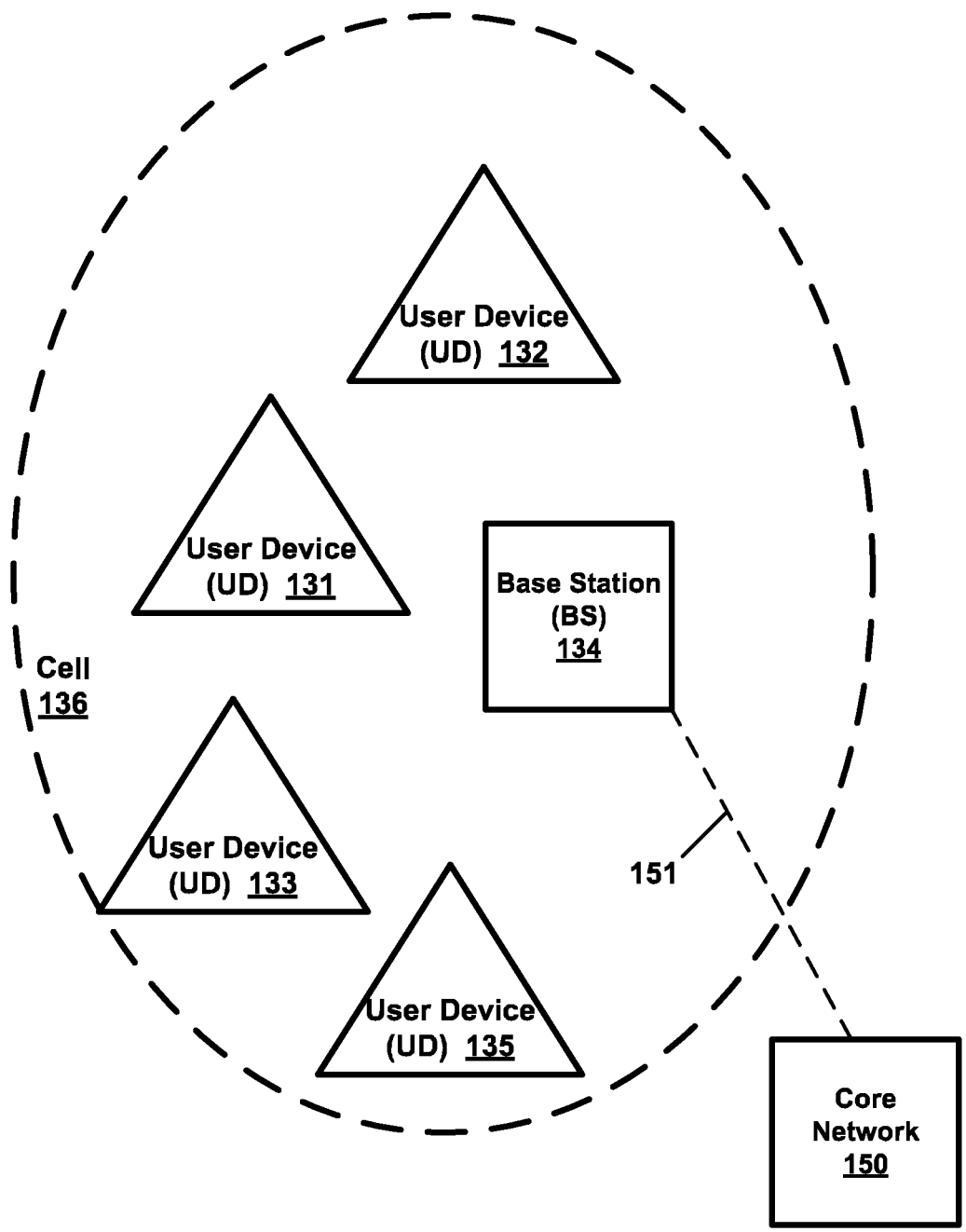
FIG. 1 is a block diagram of a wireless network according to an example implementation.

FIG. 1 is a block diagram of a wireless network 130 according to an example implementation. In the wireless network 130 of FIG. 1, user devices (UDs) 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a next-generation Node B (gNB) or a network node. At least part of the functionalities of an access point (AP), base station (BS), (e)Node B (eNB), or gNB may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a 51 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC or machine to machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing up to e.g., 1 ms U-Plane (user/data plane) latency connectivity with 1-1e-5 reliability, by way of an illustrative example. Thus, for example, URLLC user devices/UEs may require a significantly lower block error rate than other types of user devices/UEs as well as low latency. Thus, for example, a URLLC UE (or URLLC application on a UE) may require much shorter latency, as compared to an eMBB UE (or an eMBB application running on a UE).

The various example implementations may be applied to a wide variety of wireless technologies or wireless networks, such as LTE, LTE-A, 5G, IoT, MTC, eMTC, eMBB, URLLC, etc., or any other wireless network or wireless technology. These example networks, technologies or data service types are provided only as illustrative examples.

Multiple Input, Multiple Output (MIMO) may refer to a technique for increasing the capacity of a radio link using multiple transmit and receive antennas to exploit multipath propagation. MIMO may include the use of multiple antennas at the transmitter and/or the receiver. MIMO may include a multi-dimensional approach that transmits and receives two or more unique data streams through one radio channel. For example, MIMO may refer to a technique for sending and receiving more than one data signal simultaneously over the same radio channel by exploiting multipath propagation. According to an illustrative example, multi-user multiple input, multiple output (multi-user MIMIO, or MU-MIMO) enhances MIMO technology by allowing a base station (BS) or other wireless node to simultaneously transmit or receive multiple streams to different user devices or UEs, which may include simultaneously transmitting a first stream to a first UE, and a second stream to a second UE, via a same (or common or shared) set of physical resource blocks (PRBs) (e.g., where each PRB may include a set of time-frequency resources).

Also, a BS may use precoding to transmit data to a UE (based on a precoder matrix or precoder vector for the UE). For example, a UE may receive reference signals or pilot signals, and may determine a quantized version of a DL channel estimate, and then provide the BS with an indication of the quantized DL channel estimate. The BS may determine a precoder matrix based on the quantized channel estimate, where the precoder matrix may be used to focus or direct transmitted signal energy in the best channel direction for the UE. Also, each UE may use a decoder matrix may be determined, e.g., where the UE may receive reference signals from the BS, determine a channel estimate of the DL channel, and then determine a decoder matrix for the DL channel based on the DL channel estimate. For example, a precoder matrix may indicate antenna weights (e.g., an amplitude/gain and phase for each weight) to be applied to an antenna array of a transmitting wireless device. Likewise, a decoder matrix may indicate antenna weights (e.g., an amplitude/gain and phase for each weight) to be applied to an antenna array of a receiving wireless device. This applies to UL as well when a UE is transmitting data to a BS.

For example, according to an example aspect, a receiving wireless user device may determine a precoder matrix using Interference Rejection Combining (IRC) in which the user device may receive reference signals (or other signals) from a number of BSs (e.g., and may measure a signal strength, signal power, or other signal parameter for a signal received from each BS), and may generate a decoder matrix that may suppress or reduce signals from one or more interferers (or interfering cells or BSs), e.g., by providing a null (or very low antenna gain) in the direction of the interfering signal, in order to increase a signal-to interference plus noise ratio (SINR) of a desired signal. In order to reduce the overall interference from a number of different interferers, a receiver may use, for example, a Linear Minimum Mean Square Error Interference Rejection Combining (LMMSE-IRC) receiver to determine a decoding matrix. The IRC receiver and LMMSE-IRC receiver are merely examples, and other types of receivers or techniques may be used to determine a decoder matrix. After the decoder matrix has been determined, the receiving UE/user device may apply antenna weights (e.g., each antenna weight including amplitude and phase) to a plurality of antennas at the receiving UE or device based on the decoder matrix. Similarly, a precoder matrix may include antenna weights that may be applied to antennas of a transmitting wireless device or node. This applies to a receiving BS as well.

During a handover, for example, a classic handover (HO), a source node (e.g., network node, cell, etc.) starts forwarding data to a target node after a handover command is delivered to a user equipment (UE). The data is forwarded to the UE once the source node sets up a connection (e.g., a control plane (CP) and a user plane (UP)) to the target node. However, the connection set up to the target node can fail, for example, due to radio conditions at the target node (or source node) or due to incorrect settings at the target node (or source node). As a result of the connection set up failure, the target node cannot transmit/receive data to/from the UE and a handover failure can occur.

If a handover failure occurs, the UE can start a cell search procedure to find another suitable node (e.g., a third node). This third node may be referred to as a re-establishment node in the present disclosure. The re-establishment node may be the source mode (e.g., if the handover was triggered too early, referred to as "Too Early HO") or the third node (e.g., if the handover was to a wrong cell/node, referred to as "Handover to Wrong Cell"). If the source node is the re-establishment node, the source node may still have UE context information available (e.g., information that the handover was not completed). Otherwise, the re-establishment node may retrieve the UE context information from the source node. In either case, the UE may try to re-establish the connection. It should be noted that the data forwarding procedures described earlier apply to other types of handovers as well, e.g., a dual active protocol stack (DAPS) handover, a conditional handover (CHO), etc.

In some implementations, the source node may have started forwarding user data (e.g., downlink user data destined for the UE) to the target node when the handover was initiated (e.g., prior to the handover failure). But the data that was forwarded to the target node prior to the handover failure may not have been delivered to the UE due to the handover failure, e.g., prior to the setup of the user plane, and may have been buffered at the target node. This buffered data at the target node that has not been delivered to the UE may be also be referred to as undelivered buffered data or undelivered data. If the buffered data is stored at the source node, the procedure to retrieve UE context information may support exchange of information needed for data forwarding (e.g., forwarding the buffered data) from the source node. However, the source node may simply forward the downlink user data to the target node without storing it as, for example, the storing of the downlink user data at the source node may be expensive, for example, from a resource point of view and/or may not be needed for most handovers. In other words, the storing of the forwarded data may not be the most efficient way to address handover failure scenarios as the percentage of handover failures is very low.

If the UE re-establishes the connection with the re-establishment node, the data that was previously forwarded from the source node to the target node and not delivered to the UE may be considered as lost as the target node cannot transmit/re-transmit the data to the UE (e.g., no connection between the target node and the UE). However, the lost data (e.g., packets) may be re-transmitted later to the UE by higher layers. This may result in increased latency in user plane communications and thereby affect user experience, e.g., impaired video streaming.

In addition, in CP/UP split scenarios, each node may be served with a different UP entity. In such cases, the forwarded data has to be moved from the UP of the target node to the UP of the re-establishment node and the existing signaling may be sufficient (e.g., bearer context setup procedure, bearer context release procedure, etc.). The above described problem for downlink data (may not apply to uplink data as the uplink data is stored at the UE) has not been addressed in 3GPP standardization so far and the retrieval of UE context information in case of a re-establishment attempt in an unprepared cell does not include any means to avoid the packet loss. Therefore, there is a desire and/or need to minimize/eliminate data loss during handover failures, for example, when a UE selects another node (e.g., re-establishment node) based on a cell search after the handover failure.

The present disclosure describes mechanisms/procedures to enable (e.g., allow, support, etc.) forwarding of downlink user data buffered at a target node (and which may not have been undelivered to the UE prior to the handover failure) to a re-establishment node with which the UE may have successfully re-established the connection after the handover failure. In an example implementation, the downlink user data may be forwarded directly from the target node to the re-establishment node. In another example implementation, the downlink user data may be forwarded from the target node to source node first and then forwarded from the source node to the re-establishment node, if needed. In some implementations, for example, it should be noted that the re-establishment node may be the source node itself or a new node that is different from the source and target nodes.

In some implementations, for example, a forwarding tunnel may be established from the target node to the re-establishment node. The information on tunnel endpoint identifiers (TEIDs) at the re-establishment node for one or more data radio bearers (DRBs) that may require data forwarding may be delivered to the target node storing the buffered data. In an example implementation, if the UE re-establishes the connection with the source node (e.g., source node is the re-establishment node), the source node may provide the TEIDs to the target node so that it may forward the buffered data to the source node. In another example implementation, if the UE re-establishes the connection at a third node, the information about the forwarding tunnel addresses may be provided to the target node from the source node upon receiving a request for data forwarding from the re-establishment node or directly from the re-establishment node.

Figure 2:
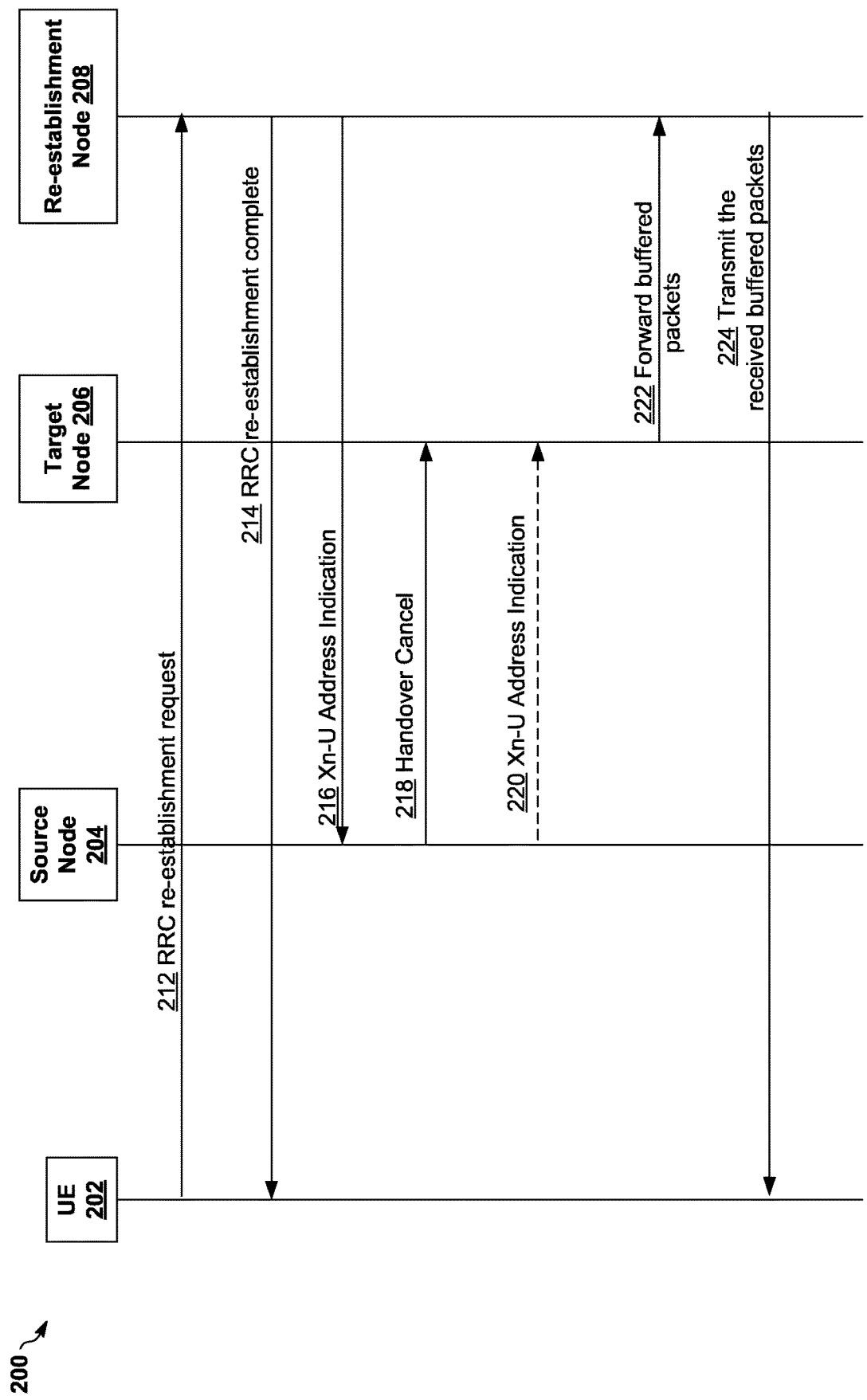
FIGS. 2-4 illustrate forwarding of user data from a target node to a re-establishment node, according to various example implementations.

FIG. 2 illustrates forwarding of user data 200 from a target node to a re-establishment node, according to an example implementation.

In an example implementation, FIG. 2 illustrates a user equipment, e.g., UE 202, a source node (or gNB) 204, a target node (or gNB) 206, and/or a re-establishment node (or gNB) 208, and the UE may be in a handover from source node 204 to target node 206. In some scenarios, the handover from source node 204 to target node 206 may fail for various reasons (e.g., radio link failure, reconfiguration failure, integrity check failure, etc.) and UE 202 may declare a handover failure.

At 212, upon handover failure, UE 202 may send an RRC re-establishment request to re-establishment node 208 to initiate a radio resource control (RRC) re-establishment procedure. The RRC re-establishment procedure may be initiated by the UE, when the UE is in RRC_CONNECTED mode, to re-establish the RRC connection. In an example implementation, the re-establishment node may be a node that is different from source node 204 and target node 206 or source node 204 may be the re-establishment node. In some implementations, for example, upon the UE initiating the RRC re-establishment procedure, re-establishment node 208 may send a retrieve UE context request (e.g., retrieve UE context request message) to source node 204. The source node may respond to such request with retrieve UE context response (e.g., retrieve UE context response message) with data radio bearer (DRB) information.

At 214, UE 202 may receive RRC re-establishment complete message from re-establishment node 208. In some implementations, for example, the UE may receive the RRC re-establishment complete message from re-establishment node 208 upon successful completion of the RRC re-establishment procedure.

At 216, re-establishment node 208 may send an Xn-U address indication message (also referred to Xn user plane address indication message) to source node 204. In some implementations, for example, re-establishment node 208 may keep the DRB mapping and send an Xn-U address indication message (Xn) or a data forwarding address indication (X2) message to source node 204. In an example implementation, the Xn-U address indication message or data forwarding address indication message may include tunnel addresses of the DRBs (e.g., TEIDs of DRBs at re-establishment node 208).

At 218, source node 204 may send a handover cancel message to target node 206. The handover cancel message may be used by source node 204 to cancel the handover at target node 206 (e.g., as the handover from source node 204 to target node 206 failed). In some implementations, for example, the handover cancel message may include tunnel endpoint information (e.g., TEIDs).

Optionally, at 220, in some implementations, source node 204 may send an Xn-U user plane address indication or data forwarding address indication message to target node 206. In some implementations, alternatively, for example, source node 204 may use a class-2 procedure (e.g., one-way message/signaling that may not require a response from recipient entity).

At 222, target node 206 may forward the buffered packets at the target node (for example, packets which were not transmitted to the UE due to connection failure and buffered at target node 206) to re-establishment node 208. In some implementations, for example, target node 206 may use TEIDs received at 218 or 220 to forward the buffered data packets to re-establishment node 208.

At 224, re-establishment node 208 may transmit the buffered packets received from target node 206 to UE 202.

Thus, the packets that were undelivered and buffered at the target node may be delivered to the UE by the re-establishment node to avoid/minimize handover failures and/or improve network performance.

Figure 3:
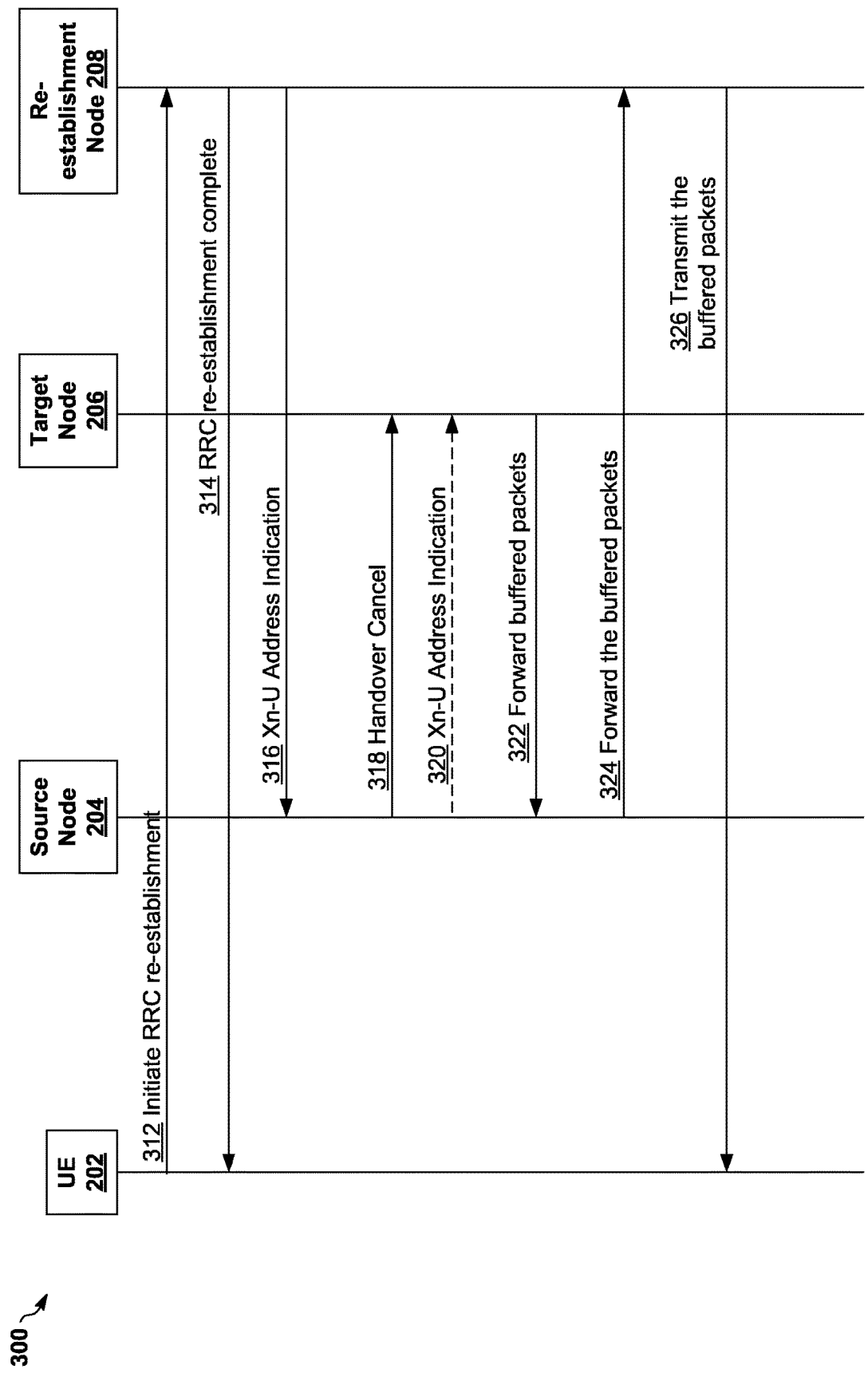

FIG. 3 illustrates forwarding of user data 300 from a target node to a re-establishment node, according to an additional example implementation.

In some implementations, for example, operations at 312, 314, 316, 318, and 320 may be same or similar to operations at 212, 214, 216, 218, and 220, respectively, of FIG. 2.

At 322, target node 206 may forward the buffered packets (for example, packets which were not transmitted to the UE due to connection failure and buffered at the target node 206) to source node 204.

At 324, source node 204 may forward the buffered packets received from target node 206 to re-establishment node 208. It should be noted that the buffered packets are forwarded from target node 206 to source node 204 and then forwarded from source node 204 to re-establishment node 208. This implementation of FIG. 3 is different from the implementation illustrated in FIG. 2 where the buffered packets are forwarded directly from target node 206 to re-establishment node 208.

At 326, re-establishment node 208 may transmit the buffered packets that were received from target node 206 (via source node 204) to UE 202.

Thus, the packets that were undelivered and buffered at the target node may be forwarded to the source node and then forwarded again to the re-establishment node to be delivered to the UE to avoid/minimize handover failures and/or improve network performance.

Figure 4:
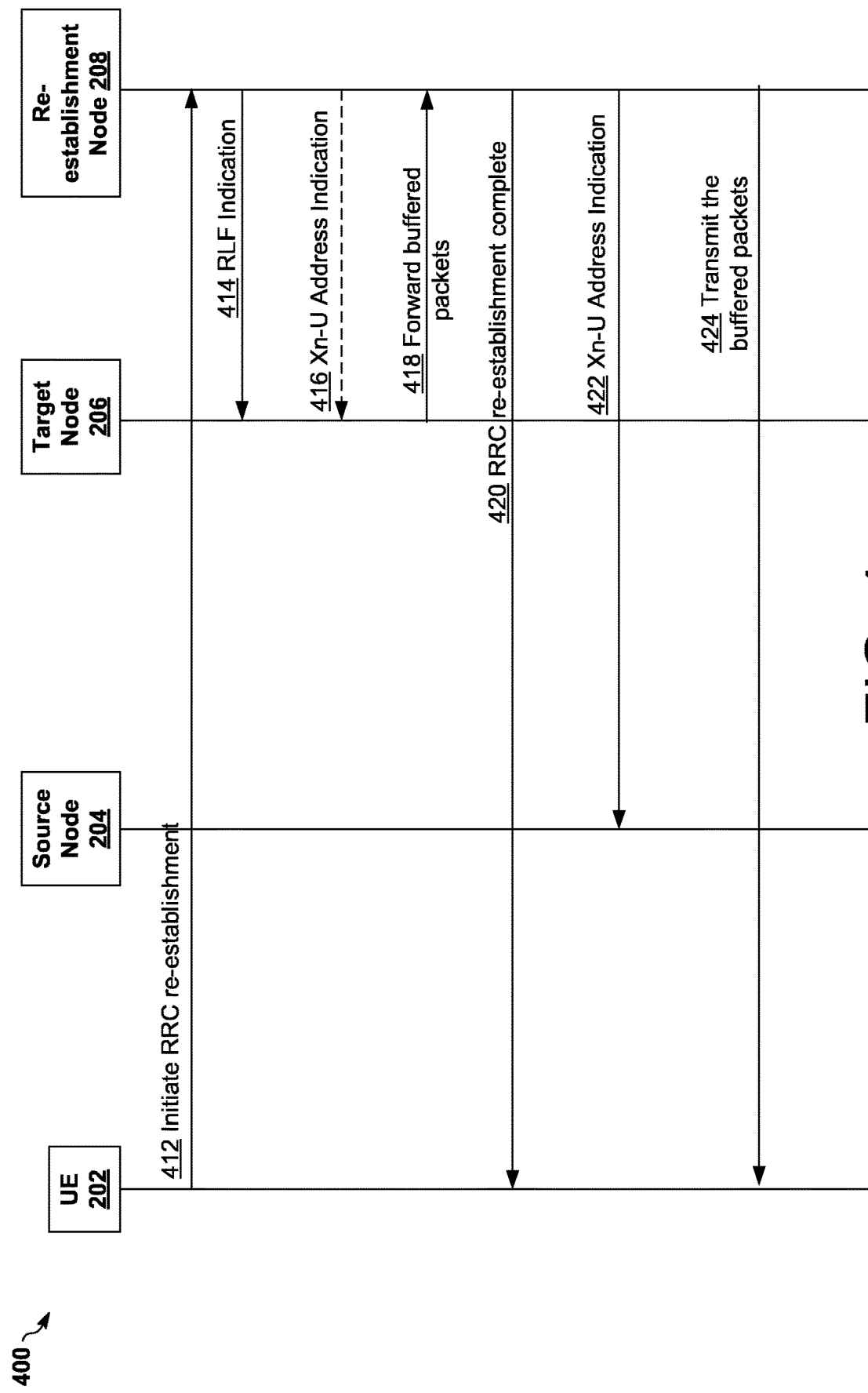

FIG. 4 illustrates forwarding of user data 400 from a target node to a re-establishment node, according to an additional example implementation.

In some implementations, for example, operation at 412 may be same or similar to operation at 212 of FIG. 2.

Optionally, in some implementations, for example, re-establishment node 208 may retrieve UE context information from source node 204 by sending a retrieve UE context request message to source node 204 and receiving a retrieve UE context response from source node 204 and may request target cell 206 to forward the buffered packets directly to re-establishment node 208 (e.g., without being forwarded via source node 204) to reduce latency, as described below.

At 414, target node 206 may receive a radio link failure (RLF) indication from re-establishment node 208. In some implementations, for example, the RLF indication message from re-establishment node 208 may contain tunnel addresses and/or endpoints of the DRBs (e.g., one or more DRBs) for target node 208.

In some implementations, for example, re-establishment node 208 may know the identity of target node 206 by retrieving an RLF report from UE 202 which may contain the identity of the node (e.g., target node 206) to which the random access/handover failed. In addition, in some implementations, for example, the initiate re-establishment message sent by the UE, at 412, may include the identity of the node to which the random access/handover failed (e.g., target node 206).

Optionally, at 416, target node 206 may receive an Xn-U address indication message from re-establishment node 208. In some implementations, for example, re-establishment node 208 may send the Xn-U address indication message containing the tunnel addresses and/or endpoints of the DRBs (e.g., one or more DRBs, or all DRBs) of re-establishment node 208. Optionally, in some implementations, for example, target node 206 may receive a data forwarding address indication (X2) message or a new class-2 message containing tunnel addresses/endpoints of the DRBs.

At 418, target node 206 may forward buffered packets to re-establishment node 208. In some implementations, for example, target node 206 may forward the buffered packets that were not delivered from target node 206 to re-establishment node 208 using the tunnel addresses for the DRBs (e.g., received at 414 or 416).

Optionally, in some implementations, if tunnel address is provided from source node 204, target node 206 may forward the buffered packets (for example, packets which were not transmitted to the UE due to connection failure and buffered at the target node 206) to source node 204 and source node 204 may forward the buffered packets received from target node 206 to re-establishment node 208. It should be noted that the buffered packets are forwarded from target node 206 to source node 204 and then forwarded from source node 204 to re-establishment node 208.

At 420, the operation may be similar to operation 214 of FIG. 2. In some implementations, for example, the UE may receive the RRC re-establishment complete message from the re-establishment node once the RRC re-establishment procedure is successful.

At 422, the operation may be same or similar to operation at 216 of FIG. 2. For example, re-establishment node 208 may send an Xn-U address indication message to source node 204. In some implementations, for example, re-establishment node 208 may keep the DRB mapping and send an Xn-U address indication message (Xn) or a data forwarding address indication (X2) message to source node 204. In an example implementation, the Xn-U address indication message or data forwarding address indication message may include tunnel addresses of the DRBs (e.g., TEIDs of DRBs at re-establishment node 208).

At 424, re-establishment node 208 may transmit the buffered packets that were received from target node 206 to UE 202.

Thus, the buffered packets that were undelivered at the target node may be forwarded to the re-establishment node to be delivered to the UE to avoid/minimize handover failures and/or improve network performance.

Figure 5:
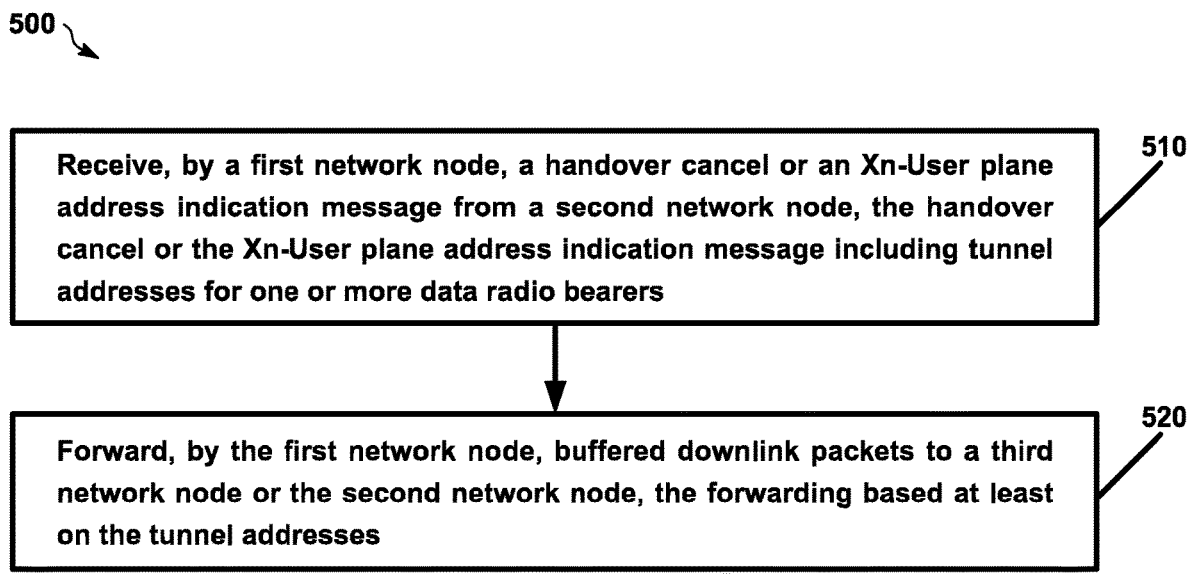
FIGS. 5-10 are flow charts illustrating forwarding of user data from a target node to a re-establishment node, according to various example implementations.

FIG. 5 is a flow chart 500 illustrating forwarding of user data from a target node to a re-establishment node, according to an example implementation.

In an example implementation, for example, at block 510, a first network node, e.g., target node (or gNB) 206, may receive a handover cancel or an Xn-User plane address indication message from a second network node, e.g., source node (or gNB) 204. In some implementations, for example, the handover cancel or Xn-User plane address indication message may include tunnel addresses for one or more data radio bearers, for example, for a third network node, e.g., re-establishment node 208.

At block 520, the target node may forward buffered downlink packets from the target node to a third network node, e.g., re-establishment node (or gNB) 208 or the source. In some implementations, for example, the forwarding of the buffered downlink packets may be based at least on the tunnel addresses of the DRBs of the re-establishment node received from the source node.

Thus, the buffered packets at the target node may be forwarded to the re-establishment node so that they could be transmitted to the UE, e.g., UE 202, to avoid/minimize handover failures and/or improve network performance.

Figure 6:
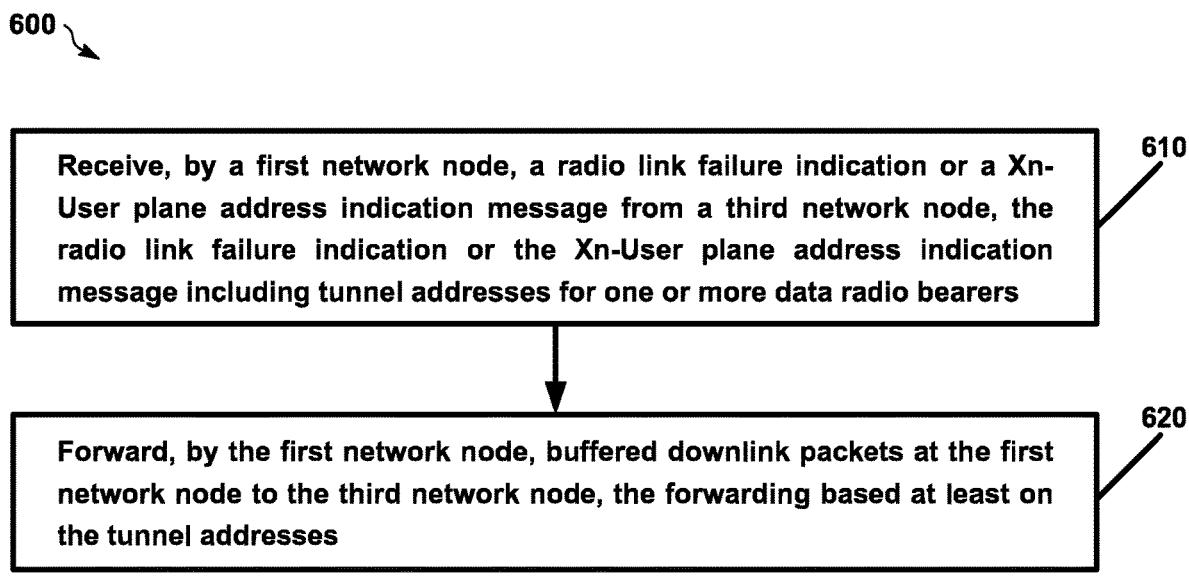

FIG. 6 is a flow chart 600 illustrating forwarding of user data from a target node to a re-establishment node, according to an additional example implementation.

In an example implementation, for example, at block 610, a first network node, e.g., target node (or gNB) 206, may receive a radio link failure (RLF) indication or a Xn-User plane address indication message from a third network node, e.g., re-establishment node (or gNB) 208. In some implementations, for example, the radio link failure indication or the Xn-User plane address indication message may include tunnel addresses for one or more data radio bearers of re-establishment node 208.

At block 620, the target node may forward buffered downlink packets at the target node to the re-establishment node. In some implementations, for example, the forwarding of the buffered downlink packets may be based at least on the tunnel addresses of the DRBs received from the re-establishment node.

Thus, the buffered packets at the target node may be forwarded to the re-establishment node so they could be transmitted to the UE, e.g., UE 202, to avoid/minimize handover failures and/or improve network performance.

Figure 7:
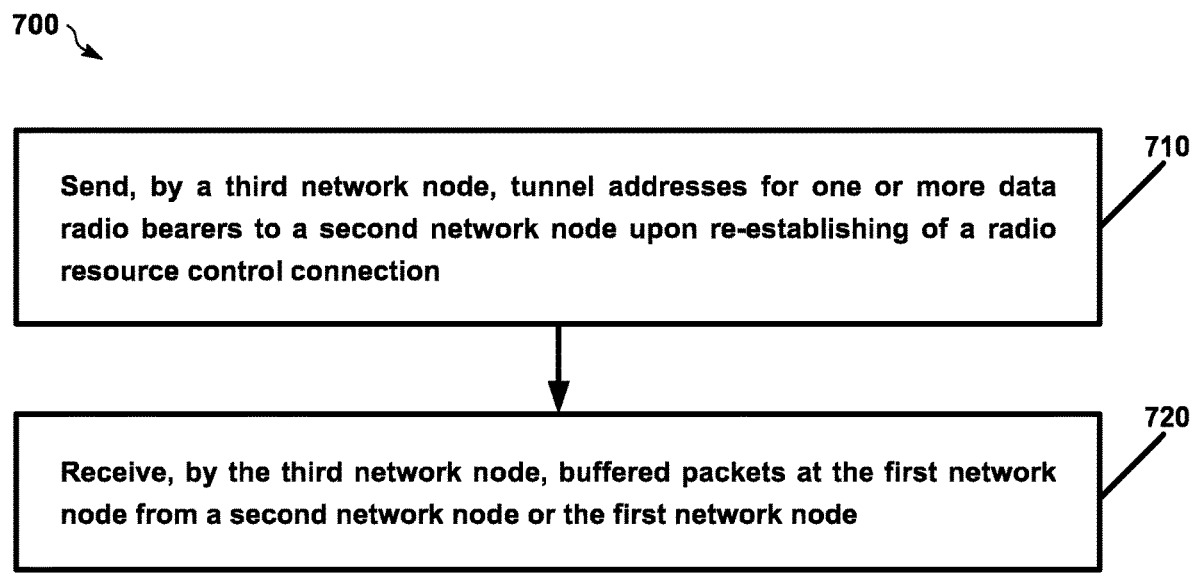

FIG. 7 is a flow chart 700 illustrating forwarding of user data from a target node to a re-establishment node, according to an example implementation.

In an example implementation, for example, at block 710, a third network node, e.g., re-establishment node (or gNB) 208, may send tunnel addresses for one or more data radio bearers to a second network node, e.g., source node (or gNB) 202, upon re-establishing of an RRC connection. The RRC connection is being re-established between re-establishment node 208 and UE 202.

At block 720, the re-establishment node may receive buffered packets (e.g., packets buffered at target node 206) from source node 204 or target node 206.

Optionally, in some implementations, for example, re-establishment node 208 may transmit the buffered packets that may have received from source 204 or target node 206 to UE 202.

Thus, the buffered packets at the target node may be forwarded to the re-establishment node so that they could be transmitted to the UE, e.g., UE 202, to avoid/minimize handover failures and/or improve network performance.

Figure 8:
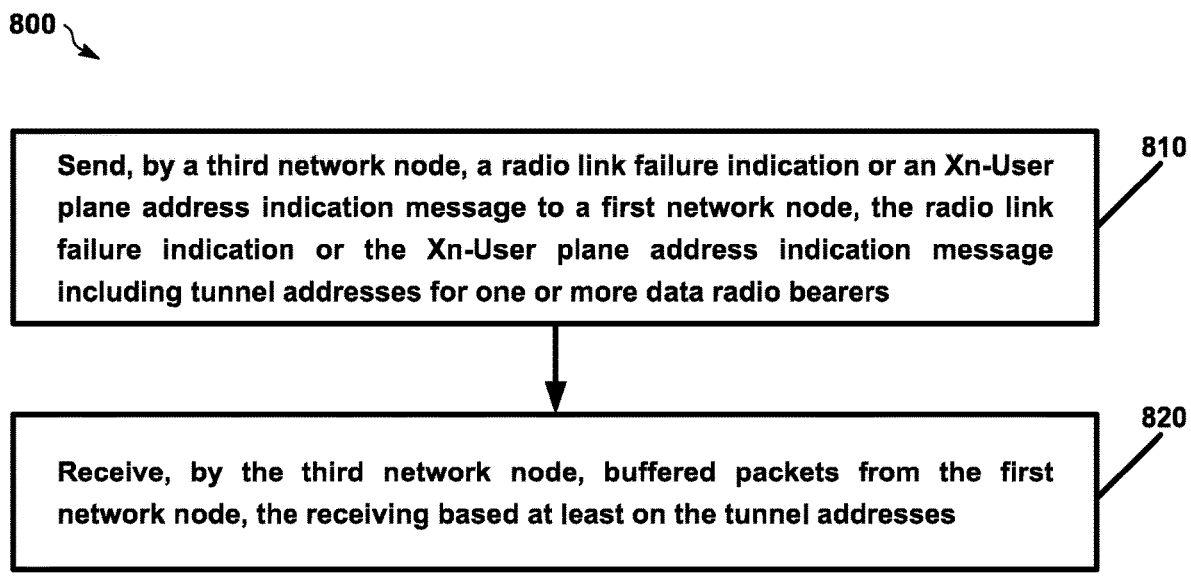

FIG. 8 is a flow chart 800 illustrating forwarding of user data from a target node to a re-establishment node, according to an example implementation.

In an example implementation, for example, at block 810, a third network node, e.g., re-establishment node (or gNB) 208, may send a radio link failure indication or an Xn-User plane address indication message to a first network node, e.g., target node (or gNB) 206. In some implementations, for example, the radio link failure indication or the Xn-User plane address indication message may include downlink tunnel addresses for one or more data radio bearers of re-establishment node 208.

At block 820, re-establishment node 208 may receive buffered packets from the first network node, e.g., target node (or gNB) 206. In some implementations, the re-establishment node may receive the buffered packets from target node 206 based at least on the downlink tunnel addresses.

Optionally, in some implementations, for example, re-establishment node 208 may transmit the buffered packets that may have received from source node 204 to UE 202.

Thus, the buffered packets at the target node may be forwarded by the source node (upon receiving them from the target node) to the re-establishment node so they could be transmitted to the UE, e.g., UE 202, to avoid/minimize handover failures and/or improve network performance.

Figure 9:
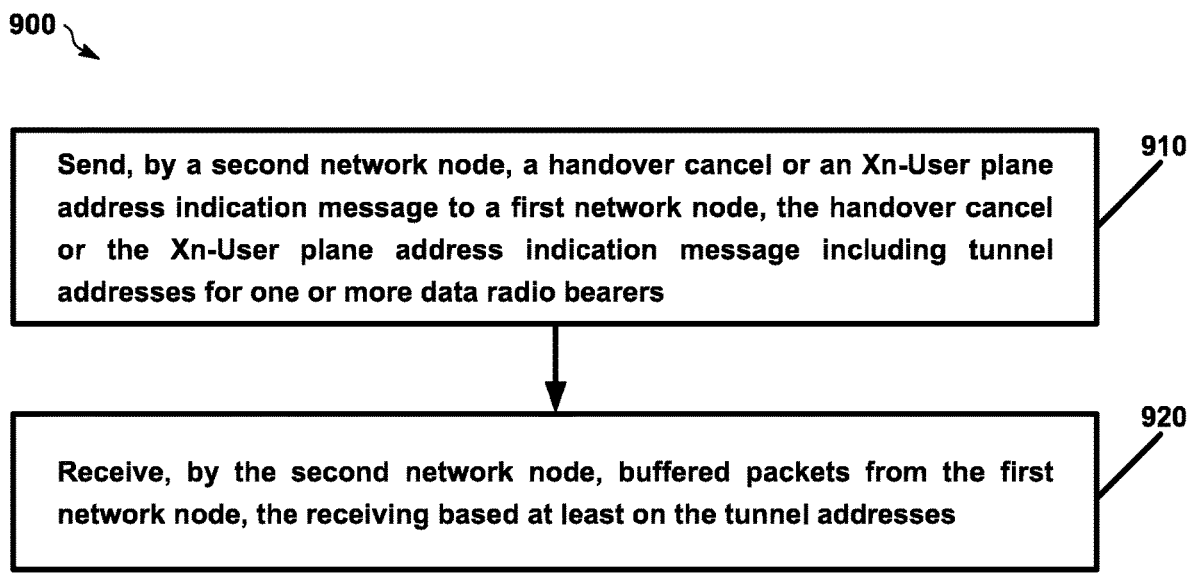

FIG. 9 is a flow chart 900 illustrating forwarding of user data from a target node to a re-establishment node, according to an example implementation.

In an example implementation, for example, at block 910, a second network node, e.g., source node (or gNB) 204, may send a handover cancel or an Xn-User plane address indication message to a first network node, e.g., target node (or gNB) 206. In some implementations, for example, the handover cancel or the Xn-User plane address indication message may include tunnel addresses for one or more data radio bearers.

At block 920, source node 202 may receive buffered packets from the target node. In some implementations, for example, the receiving of the buffered packets by source node 202 may be based at least on the tunnel addresses of re-establishment node 208.

Optionally, in some implementations, for example, source node 202 may forward the buffered packets received from target node 206 to re-establishment node 208 so that they could be transmitted to UE 202.

Thus, the buffered packets at the target node may be received by the source node and forwarded to the re-establishment node so they could be forwarded to the UE, e.g., UE 202, to avoid/minimize handover failures and/or improve network performance.

Figure 10:
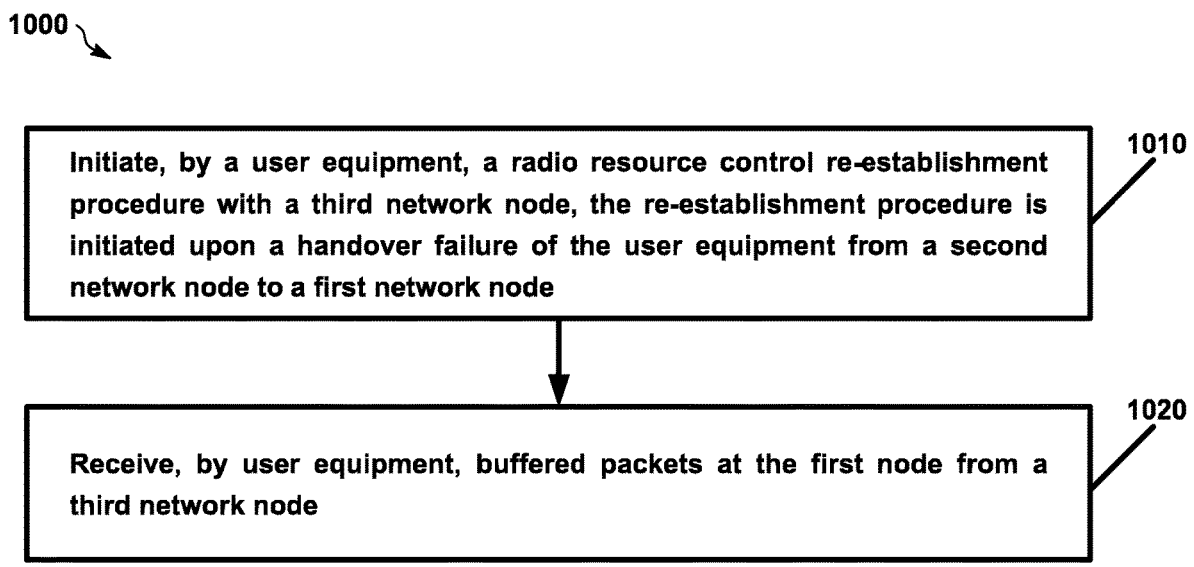

FIG. 10 is a flow chart 1000 illustrating forwarding of user data from a target node to a re-establishment node, according to an example implementation.

In an example implementation, for example, at block 1010, a user equipment, e.g., UE 202, may initiate a radio resource control re-establishment procedure with a third network node, e.g., re-establishment node 208. In some implementations, for example, the re-establishment procedure may be initiated upon a handover failure of UE 202 from a source node 204 to target node 206.

At block 1020, the UE may receive buffered packets at target node 206 (e.g., packets that are buffered at target node 206) from re-establishment node 208.

Thus, the packets that are buffered at the target node may be received by the UE from the re-establishment node to avoid/minimize handover failures and/or improve network performance.

In the above described implementations, packet losses may be avoided (or minimized) during handover failures which may result in better user experience, reduced signaling and resource overhead (e.g., by minimizing TCP re-transmissions). In addition, in some implementations, for example, downlink user data may be forwarded directly from the target node to the re-establishment node (without going through the source node) to reduce latency.

Additional example implementations are described herein.

Example 1. A method of communications, comprising: receiving, by a first network node, a handover cancel or an Xn-User plane address indication message from a second network node, the handover cancel or the Xn-User plane address indication message including tunnel addresses for one or more data radio bearers; and forwarding, by the first network node, buffered downlink packets to a third network node or the second network node, the forwarding based at least on the tunnel addresses.

Example 2. A method of communications, comprising: receiving, by a first network node, a radio link failure indication or a Xn-User plane address indication message from a third network node, the radio link failure indication or the Xn-User plane address indication message including tunnel addresses for one or more data radio bearers; and forwarding, by the first network node, buffered downlink packets at the first network node to the third network node, the forwarding based at least on the tunnel addresses.

Example 3. A method of communications, comprising: sending, by a third network node, tunnel addresses for one or more data radio bearers to a second network node upon re-establishing of a radio resource control connection; and receiving, by the third network node, buffered packets at the first network node from a second network node or the first network node.

Example 4. The method of Example 3, further comprising: transmitting the packets from the third network node to the user equipment.

Example 5. A method of communications, comprising: sending, by a third network node, a radio link failure indication or an Xn-User plane address indication message to a first network node, the radio link failure indication or the Xn-User plane address indication message including tunnel addresses for one or more data radio bearers; and receiving, by the third network node, buffered packets from the first network node, the receiving based at least on the tunnel addresses.

Example 6. The method of Example 5, further comprising: transmitting the packets from the third network node to a user equipment.

Example 7. The method of any of Examples 5-6, further comprising: retrieving a radio link failure report from the user equipment, wherein the radio link failure report includes an identity of the first network node.

Example 8. The method of any of Examples 5-7, further comprising: receiving radio link failure information from the user equipment.

Example 9. A method of communications, comprising: sending, by a second network node, a handover cancel or an Xn-User plane address indication message to a first network node, the handover cancel or the Xn-User plane address indication message including tunnel addresses for one or more data radio bearers; and receiving, by the second network node, buffered packets from the first network node, the receiving based at least on the tunnel addresses.

Example 10. The method of Example 9, further comprising: forwarding the packets to the third network node.

Example 11. The method of any of Examples 9-10, wherein the packets are forwarded to the third network node prior to the forwarding of newly arriving packets.

Example 12. A method of communications, comprising: initiating, by a user equipment, a radio resource control re-establishment procedure with a third network node, the re-establishment procedure is initiated upon a handover failure of the user equipment from a second network node to a first network node; and receiving, by user equipment, buffered packets at the first node from a third network node.

Example 13. The method of any of Examples 1-12, wherein the first network node is a target node, the second network node is a source node, and third network node is a re-establishment node.

Example 14. An apparatus comprising: at least one processor; and at least one memory including computer program code; the at least one memory and the computer program code configured to, with the at least one processor, cause the apparatus to: receive, by a first network node, a handover cancel or an Xn-User plane address indication message from a second network node, the handover cancel or the Xn-User plane address indication message including tunnel addresses for one or more data radio bearers; and forward, by the first network node, buffered downlink packets to a third network node or the second network node, the forwarding based at least on the tunnel addresses.

Example 15. An apparatus comprising: at least one processor; and at least one memory including computer program code; the at least one memory and the computer program code configured to, with the at least one processor, cause the apparatus to: receive, by a first network node, a radio link failure indication or a Xn-User plane address indication message from a third network node, the radio link failure indication or the Xn-User plane address indication message including tunnel addresses for one or more data radio bearers; and forward, by the first network node, buffered downlink packets at the first network node to the third network node, the forwarding based at least on the tunnel addresses.

Example 16. An apparatus comprising: at least one processor; and at least one memory including computer program code; the at least one memory and the computer program code configured to, with the at least one processor, cause the apparatus to: send, by a third network node, tunnel addresses for one or more data radio bearers to a second network node upon re-establishing of a radio resource control connection; and receive, by the third network node, buffered packets at the first network node from a second network node or the first network node.

Example 17. The apparatus of Example 16, the at least one memory and the computer program code are further configured to, with the at least one processor, to further cause the apparatus to: transmit the packets from the third network node to the user equipment.

Example 18. An apparatus comprising: at least one processor; and at least one memory including computer program code; the at least one memory and the computer program code configured to, with the at least one processor, cause the apparatus to: send, by a third network node, a radio link failure indication or an Xn-User plane address indication message to a first network node, the radio link failure indication or the Xn-User plane address indication message including tunnel addresses for one or more data radio bearers; and receive, by the third network node, buffered packets from the first network node, the receiving based at least on the tunnel addresses.

Example 19. The apparatus of Example 18, the at least one memory and the computer program code are further configured to, with the at least one processor, to further cause the apparatus to: transmit the packets from the third network node to a user equipment.

Example 20. The apparatus of any of Examples 18-19, the at least one memory and the computer program code are further configured to, with the at least one processor, to further cause the apparatus to: retrieve a radio link failure report from the user equipment, wherein the radio link failure report includes an identity of the first network node.

Example 21. The apparatus of any of Examples 18-20, the at least one memory and the computer program code are further configured to, with the at least one processor, to further cause the apparatus to: receive radio link failure information from the user equipment.

Example 22. An apparatus comprising: at least one processor; and at least one memory including computer program code; the at least one memory and the computer program code configured to, with the at least one processor, cause the apparatus to: send, by a second network node, a handover cancel or an Xn-User plane address indication message to a first network node, the handover cancel or the Xn-User plane address indication message including tunnel addresses for one or more data radio bearers; and receive, by the second network node, buffered packets from the first network node, the receiving based at least on the tunnel addresses.

Example 23. The apparatus of Example 22, the at least one memory and the computer program code are further configured to, with the at least one processor, to further cause the apparatus to: forward the packets to the third network node.

Example 24. The apparatus of any of Example 22-23, comprising being configured to cause the apparatus to forward the packets to the third network node prior to the forwarding of newly arriving packets.

Example 25. An apparatus comprising: at least one processor; and at least one memory including computer program code; the at least one memory and the computer program code configured to, with the at least one processor, cause the apparatus to: initiate, by a user equipment, a radio resource control re-establishment procedure with a third network node, the re-establishment procedure is initiated upon a handover failure of the user equipment from a second network node to a first network node; and receive, by user equipment, buffered packets at the first node from a third network node.

Example 26. The apparatus of any of Example 14-25, wherein the first network node is a target node, the second network node is a source node, and third network node is a re-establishment node.

Figure 11:
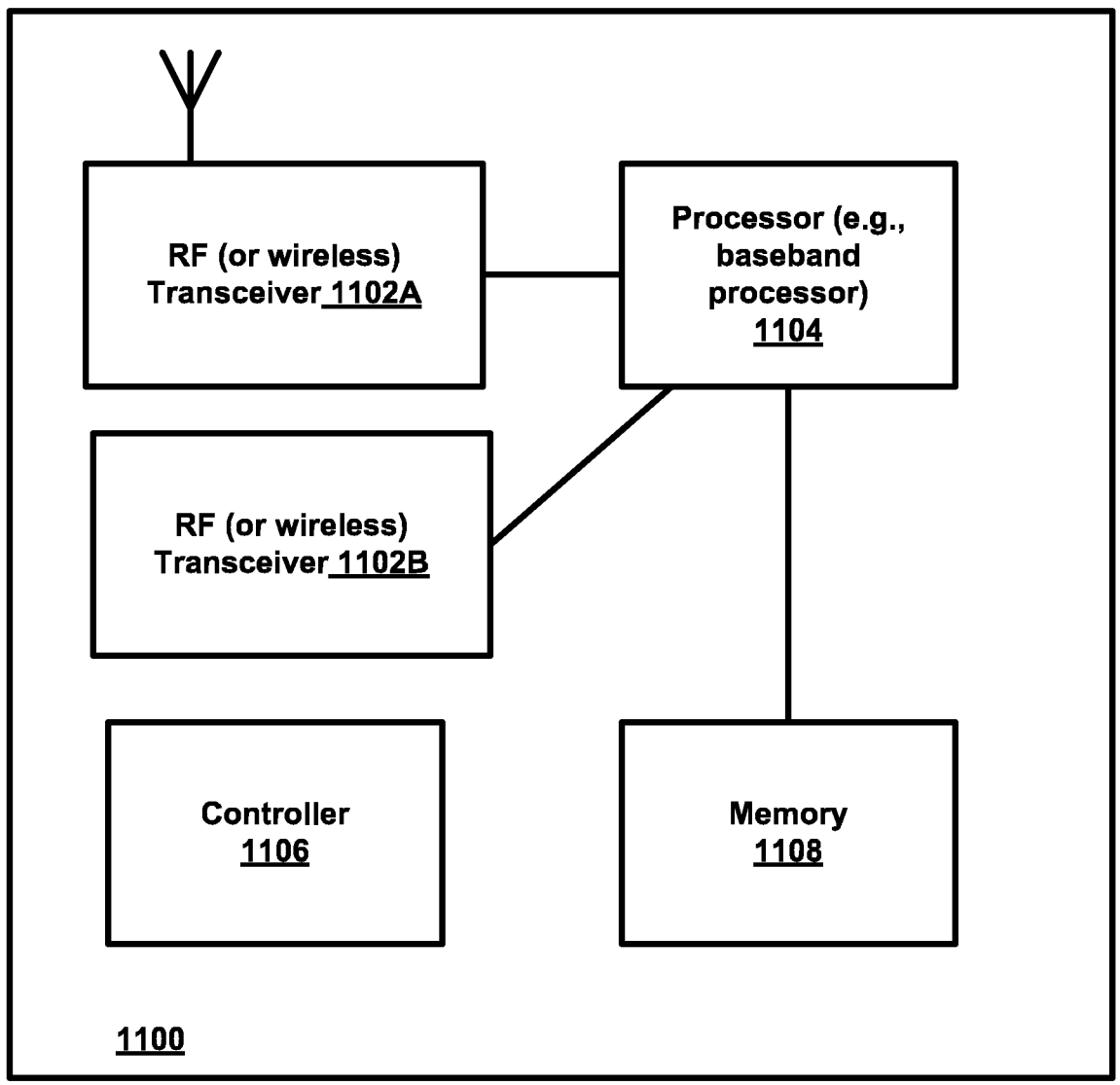
FIG. 11 is a block diagram of a node or wireless station (e.g., base station/access point or mobile station/user device/UE), according to an example implementation.

FIG. 11 is a block diagram of a wireless station (e.g., user equipment (UE)/user device or AP/gNB/MgNB/SgNB) 1100 according to an example implementation. The wireless station 1100 may include, for example, one or more RF (radio frequency) or wireless transceivers 1102A, 1102B, where each wireless transceiver includes a transmitter to transmit signals and a receiver to receive signals. The wireless station also includes a processor or control unit/entity (controller) 1104/1106 to execute instructions or software and control transmission and receptions of signals, and a memory 1108 to store data and/or instructions.

Processor 1104 may also make decisions or determinations, generate frames, packets or messages for transmission, decode received frames or messages for further processing, and other tasks or functions described herein. Processor 1104, which may be a baseband processor, for example, may generate messages, packets, frames or other signals for transmission via wireless transceiver 1102 (1102A or 1102B). Processor 1104 may control transmission of signals or messages over a wireless network, and may control the reception of signals or messages, etc., via a wireless network (e.g., after being down-converted by wireless transceiver 1102, for example). Processor 1104 may be programmable and capable of executing software or other instructions stored in memory or on other computer media to perform the various tasks and functions described above, such as one or more of the tasks or methods described above. Processor 1104 may be (or may include), for example, hardware, programmable logic, a programmable processor that executes software or firmware, and/or any combination of these. Using other terminology, processor 1104 and transceiver 1102 together may be considered as a wireless transmitter/receiver system, for example.

In addition, referring to FIG. 11, a controller 1106 (or processor 1104) may execute software and instructions, and may provide overall control for the station 1100, and may provide control for other systems not shown in FIG. 11, such as controlling input/output devices (e.g., display, keypad), and/or may execute software for one or more applications that may be provided on wireless station 1100, such as, for example, an email program, audio/video applications, a word processor, a Voice over IP application, or other application or software. Moreover, a storage medium may be provided that includes stored instructions, which when executed by a controller or processor may result in the processor 1104, or other controller or processor, performing one or more of the functions or tasks described above.

According to another example implementation, RF or wireless transceiver(s) 1102A/1102B may receive signals or data and/or transmit or send signals or data. Processor 1104 (and possibly transceivers 1102A/1102B) may control the RF or wireless transceiver 1102A or 1102B to receive, send, broadcast or transmit signals or data.

The aspects are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (e.g., sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

What is claimed is:

1. A user equipment comprising:
at least one processor; and
at least one memory including computer program code;
the at least one memory and the computer program code configured to, with the at least one processor, cause the user equipment to:
  initiate a radio resource control re-establishment procedure with a third network node, wherein the re-establishment procedure is initiated upon a handover failure of the user equipment from a second network node to a first network node; and
  receive, from a third network node, packets that are buffered at the first network node,
wherein the first network node is a target node, the second network node is a source node, and the third network node is a re-establishment node,
wherein the at least one memory and the computer program code are further configured to, with the at least one processor, cause the user equipment to:
  receive, from the third network node, packets that are buffered at the first node and which were not transmitted to the user equipment due to the handover failure or a connection failure of the user equipment; and
  send, to the third network node, a radio link failure report, wherein the radio link failure report includes an identity of the first network node,
wherein when the user equipment re-establishes a connection with the re-establishment node, the data that was previously forwarded from the source node to the target node and not delivered to the user equipment is considered as lost when the target node cannot transmit and/or re-transmit the data to the user equipment due to no connection between the target node and the user equipment, wherein the lost data is received later at the user equipment by higher layers, wherein the at least one memory and the computer program code are further configured to, with the at least one processor, cause the user equipment to:

re-establish the connection with the re-establishment node; and provide information about forwarding tunnel addresses to the target node from the source node upon receiving a request for data forwarding from the re-establishment node or directly from the re-establishment node.

2. The user equipment of claim 1, wherein when a handover failure occurs, the at least one memory and the computer program code are configured to, with the at least one processor, cause the user equipment to:

start a cell search procedure to find another suitable node;

receive reference signals from one of the network nodes;

determine a channel estimate of a downlink channel;

determine a decoder matrix for the downlink channel based on the downlink channel estimate;

determine a precoder matrix using interference rejection combining; and generate a decoder matrix that suppresses or reduces signals from one or more interferers by providing a null or very low antenna gain in a direction of the interfering signal to increase a signal-to interference plus noise ratio of a desired signal, wherein after the decoder matrix has been determined, the user equipment applies antenna weights to a plurality of antennas based on the decoder matrix.

3. A method comprising:

Initiating, by a user equipment, a radio resource control re-establishment procedure with a third network node, wherein the re-establishment procedure is initiated upon a handover failure of the user equipment from a second network node to a first network node; and receiving, by the user equipment from a third network node, packets that are buffered at the first network node, wherein the first network node is a target node, the second network node is a source node, and the third network node is a re-establishment node, wherein the method further comprises:

receiving, by the user from the third network node, packets that are buffered at the first node and which were not transmitted to the user equipment due to the handover failure or a connection failure of the user equipment; and sending, by the user equipment to the third network node, a radio link failure report, wherein the radio link failure report includes an identity of the first network node, wherein when the user equipment re-establishes a connection with the re-establishment node, the data that was previously forwarded from the source node to the target node and not delivered to the user equipment is considered as lost when the target node cannot transmit and/or re-transmit the data to the user equipment due to no connection between the target node and the user equipment, wherein the lost data is received later at the user equipment by higher layers, wherein method further comprises:

re-establishing the connection with the re-establishment node; and providing information about forwarding tunnel addresses to the target node from the source node upon receiving a request for data forwarding from the re-establishment node or directly from the re-establishment node.

* * * * *